United States Patent [19]

Tsay

[11] Patent Number: 5,211,107

[45] Date of Patent: May 18, 1993

[54] APPARATUS FOR MAKING STUFFED BUNS

[76] Inventor: Shih C. Tsay, No. 62, Lane 313, Wen Hsien Rd., Tainan, Taiwan

[21] Appl. No.: 972,221

[22] Filed: Nov. 5, 1992

[51] Int. Cl.$^5$ .................. A21C 9/00; A21C 11/00; A23G 3/00; A23P 1/00

[52] U.S. Cl. .................. 99/450.6; 99/450.7; 99/494; 425/132; 425/133.1

[58] Field of Search ............ 99/353, 355, 450.1, 99/450.2, 450.6, 450.7, 450.8, 494, 426; 425/133.1, 132, 142, 145, 164, 166, 168; 426/502, 512, 513, 516

[56] References Cited

U.S. PATENT DOCUMENTS

| | | | |
|---|---|---|---|
| 1,265,853 | 5/1918 | Wiseman | 425/133.1 |
| 2,568,491 | 9/1951 | Edwards | 425/133.1 |
| 3,479,970 | 11/1969 | Carbajal | 425/133.1 |
| 4,084,494 | 4/1978 | Ezaki | 99/494 |
| 4,251,201 | 2/1981 | Krysiak | 425/132 |
| 4,259,051 | 3/1981 | Shatila | 99/450.6 |
| 4,334,464 | 6/1982 | Shinriki | 99/450.7 |
| 4,481,872 | 11/1984 | Matthews et al. | 99/353 |
| 4,498,377 | 2/1985 | Smith | 99/450.6 |
| 4,659,580 | 4/1987 | Svengren | 426/516 |
| 4,907,957 | 3/1990 | Nakagawa et al. | 425/132 |
| 5,031,520 | 7/1991 | Tsay | 99/353 |

FOREIGN PATENT DOCUMENTS

| | | | |
|---|---|---|---|
| 115433 | 1/1969 | Norway | 99/450.6 |
| 2197615 | 5/1988 | United Kingdom . | |

*Primary Examiner*—Timothy F. Simone
*Attorney, Agent, or Firm*—Jacobson, Price, Holman & Stern

[57] ABSTRACT

A buns making device includes a tube having an upper end for receiving stuff to be stuffed in the buns, a barrel disposed on an outer and lower portion of the tube, an opening formed in the barrel for receiving a strip of dough. The dough is formed into a column of dough and moved downward beyond the barrel, the stuff leaving the tube is contained within the column of dough. The column of dough is then cut and formed into the buns.

7 Claims, 8 Drawing Sheets

FIG. 3

APPARATUS FOR MAKING STUFFED BUNS

BACKGROUND OF THE INVENTION (a) Field of the Invention

The present invention relates to an apparatus, and more particularly to an apparatus for making stuffed buns.

(b) Description of the Prior Art

A typical dough shaping machine is disclosed in U.K. Patent Application No. 2,197,615, published May 25, 1988, this patent is suitable for shaping dough only.

A typical apparatus for making buns of which applicant is aware is his prior U.S. Pat. No. 5,031,520 to Tsay, filed Sep. 11, 1990. This patent is suitable for making buns only and can not shape dough. The users have to buy a dough shaping machine for shaping the dough. The users should buy both of the apparatus for making buns, such that the cost is doubled.

The present invention has arisen to mitigate and/or obviate the afore-described disadvantages of the conventional apparatus for shaping dough and for making buns.

SUMMARY OF THE INVENTION

The primary objective of the present invention is to provide an apparatus which makes buns automatically.

In accordance with one aspect of the present invention, there is provided an apparatus for making stuffed buns comprising a tube having an upper end for receiving stuff to be stuffed in the buns, means for driving the stuff downward along the tube, a barrel disposed on an outer and lower portion of the tube, an opening formed in the barrel for receiving a strip of dough, means for forming the dough into a column of dough and for moving the dough downward beyond the barrel, the stuff leaving the tube being contained within the column of dough, and a shaping mechanism disposed below the barrel for cutting and shaping the column of dough into the buns.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a schematic view seeing from the directions of the arrows 3—3 of FIG. 2;

DETAILED DESCRIPTION OF THE INVENTION

Figure 1:
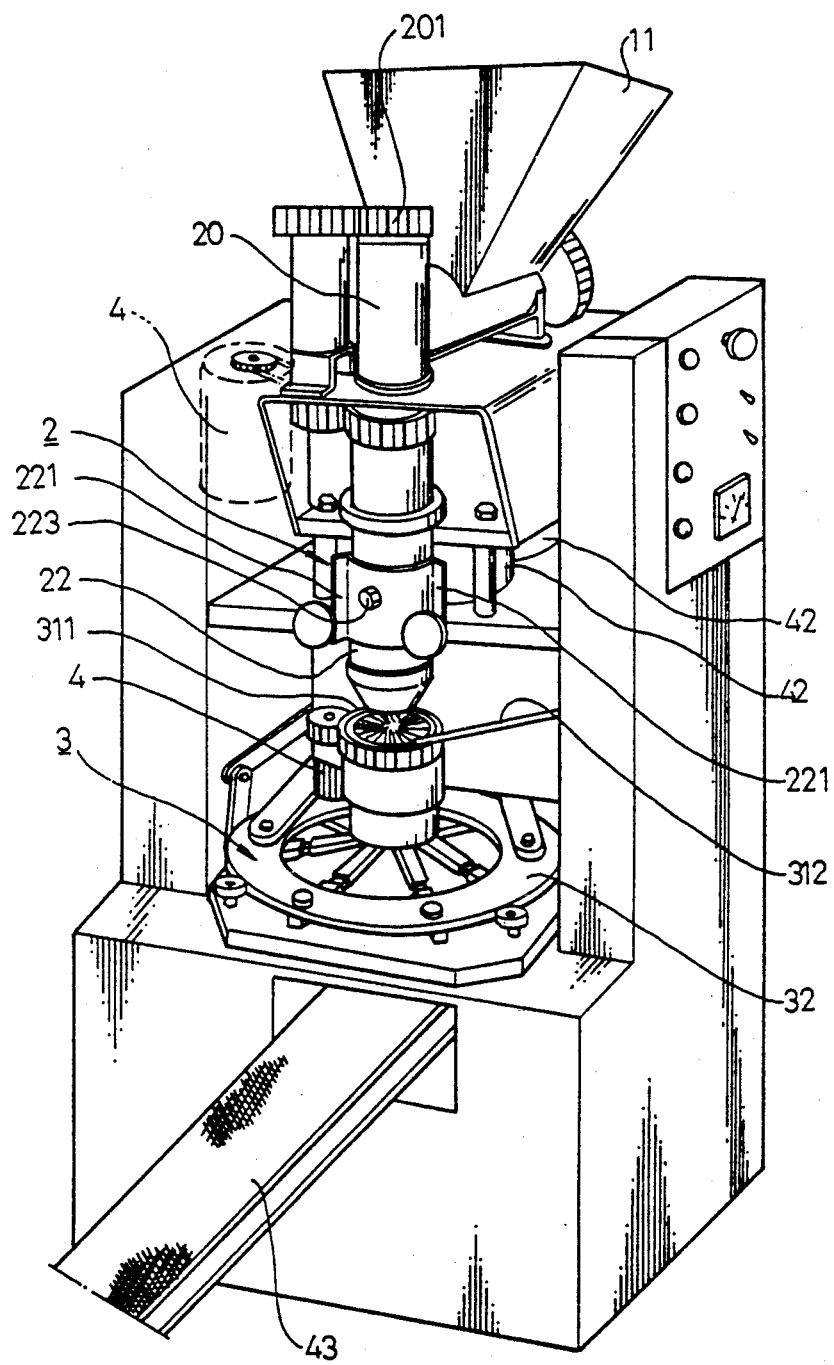
FIG. 1 is a perspective view of an apparatus in accordance with the present invention.

Referring to the drawings and initially to FIG. 1, an apparatus for making buns in accordance with the present invention comprises generally a funnel 11 for receiving the stuff to be filled within the buns, a stuffing mechanism 2 for stuffing the stuff within a dough which has a column shape, a shaping mechanism 3 for shaping and forming the buns, and a plurality of motors 4 for powering the apparatus.

Figure 4:
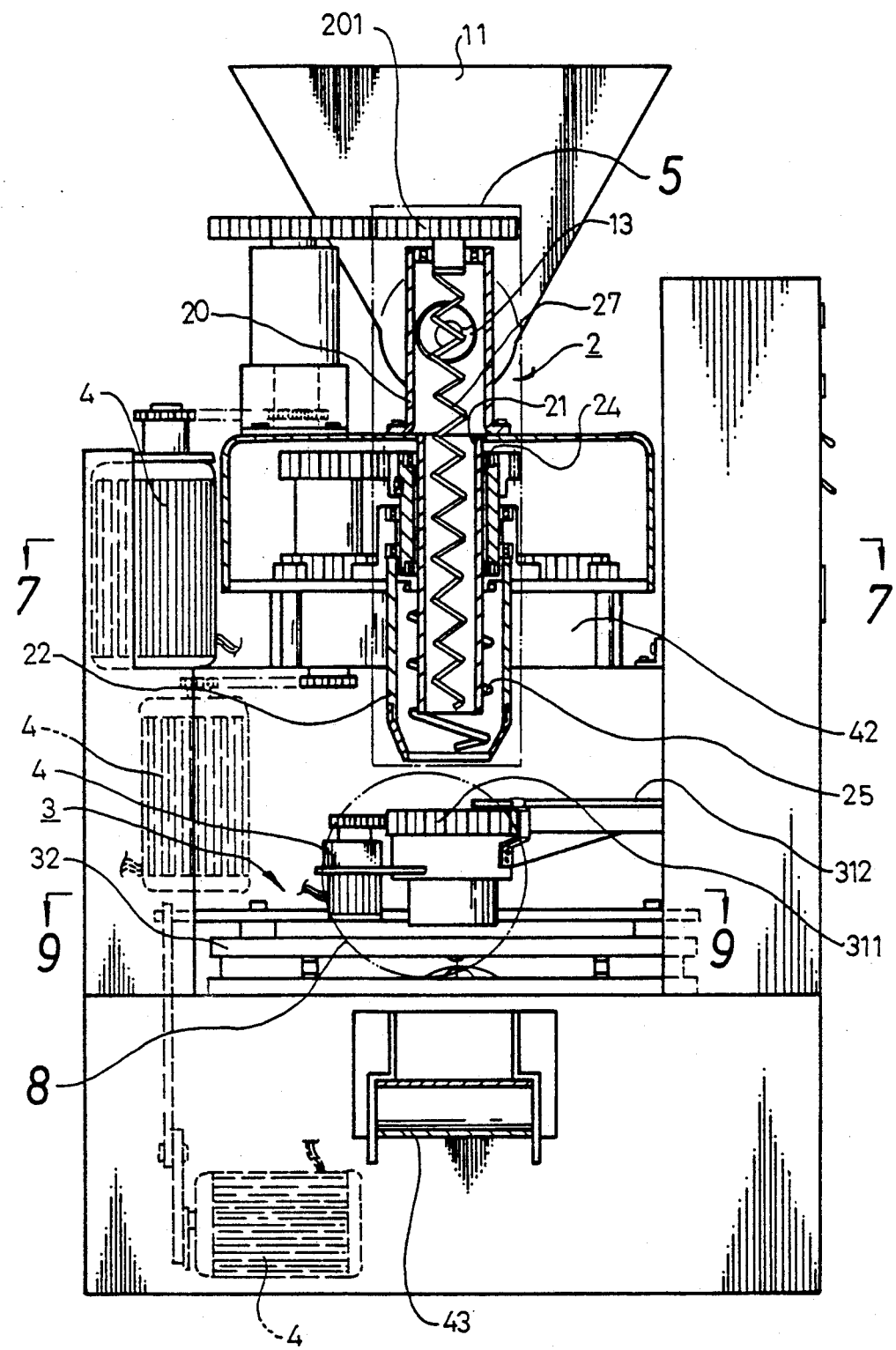
FIG. 4 is a cross sectional view taken along lines 4—4 of FIG. 3.
Figure 5:
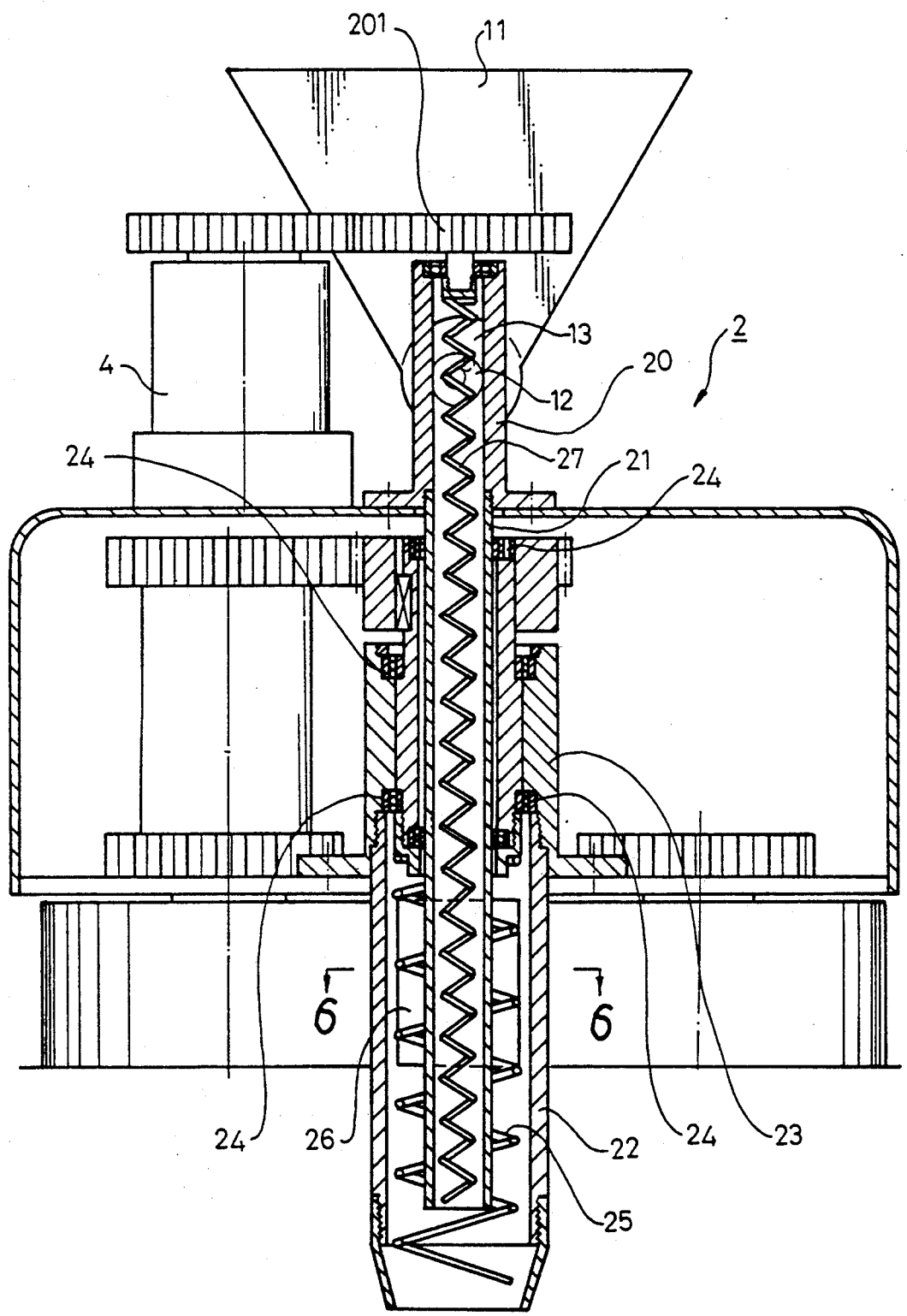
FIG. 5 is an enlarged view showing part of the apparatus as shown in FIG. 4.
Figure 3:
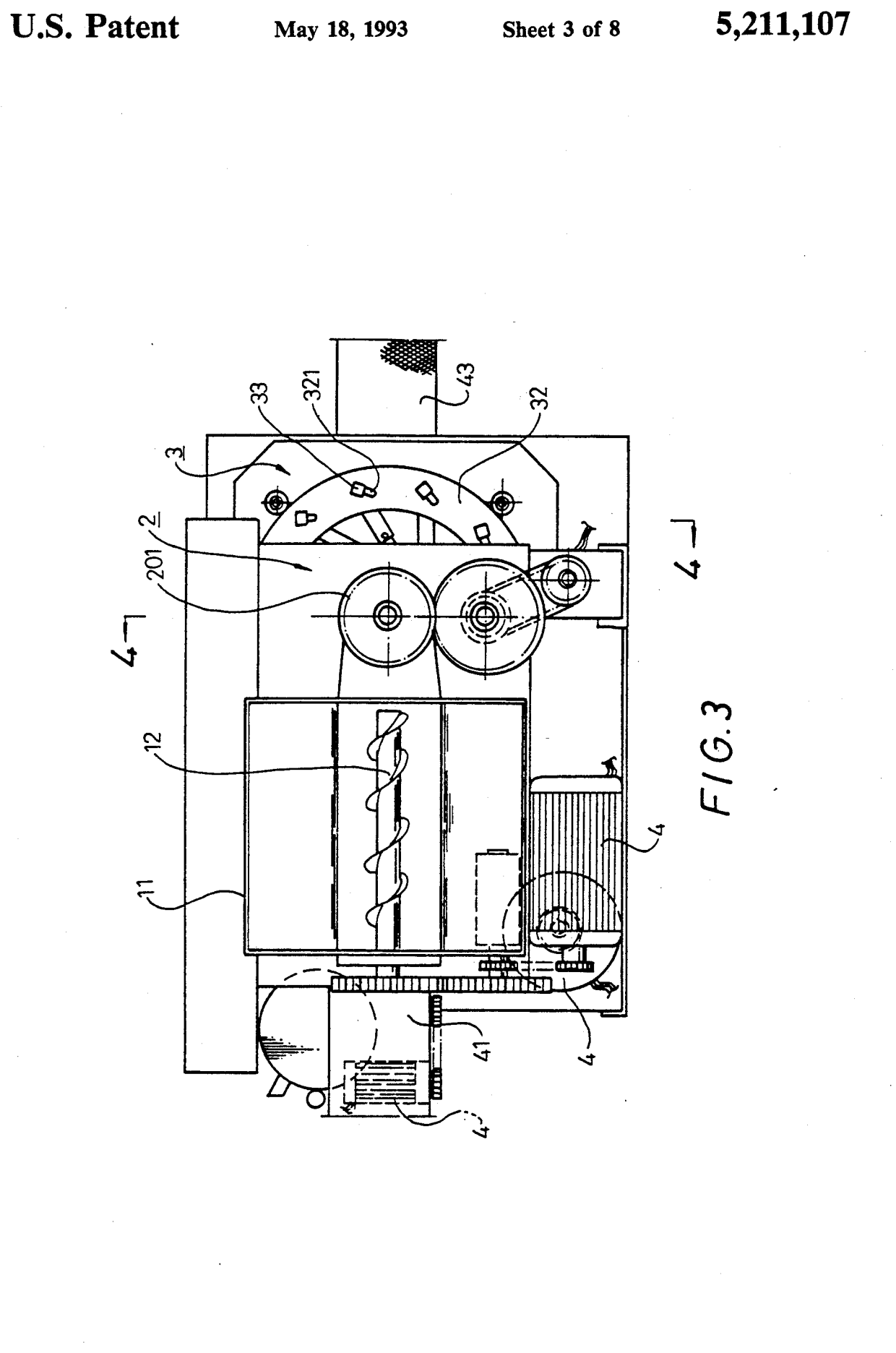

Referring next to FIGS. 2, 3, 4 and 5, a conveyer screw 12 is disposed in the bottom of the funnel 11 and driven by a motor 4 so as to convey the stuff received in the funnel 11. As shown in FIGS. 4 and 5, the stuffing mechanism 2 includes a conduit 20 including a mouth 13 connected to the funnel 11 for receiving the stuff conveyed by the conveyer screw 12, a tube 21 having an upper end fixed to the conduit 20, a gear 201 rotatably disposed on the upper portion of the conduit 20 and connected to a motor 4, a resilient member, such as a coil spring 27, disposed in the conduit 20 and the tube 21 and fixed to the gear 201 such that the spring 27 can be rotated by the motor 4, the stuff entering into the conduit 20 from the mouth 13 will be caused to move downward along the tube 21 when the spring 27 is rotated, a barrel 22 disposed on the outer and lower portion of the tube 21, a sleeve 23 rotatably supported between the tube 21 and the barrel 22 by bearings 24, a coil spring 25 disposed between the barrel 22 and the tube 21 and fixed to the sleeve 23 such that the spring 25 rotates in concert with the sleeve 23, the sleeve 23 is coupled to another motor such that the spring 25 can also be rotated. An opening 26 is formed in the middle portion of the barrel 22.

Figure 2:
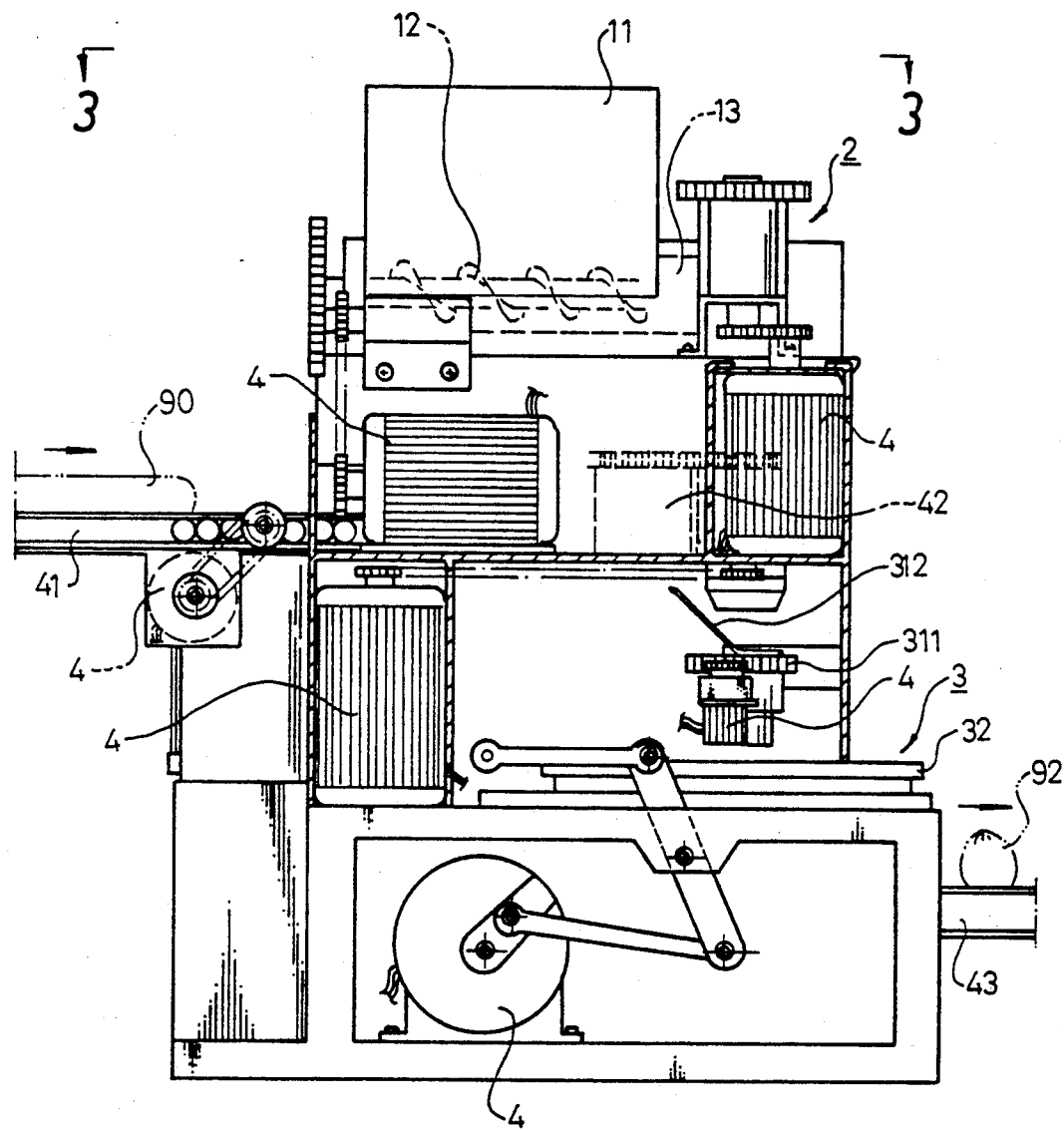
FIG. 2 is a schematic view illustrating the upper portion of the apparatus.
Figure 6:
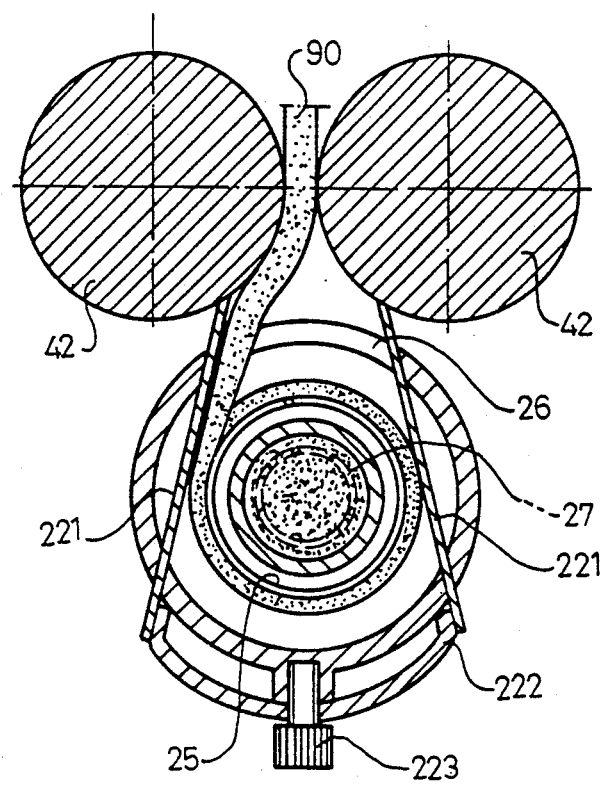
FIG. 6 is a cross sectional view taken along lines 6—6 of FIG. 5.
Figure 7:
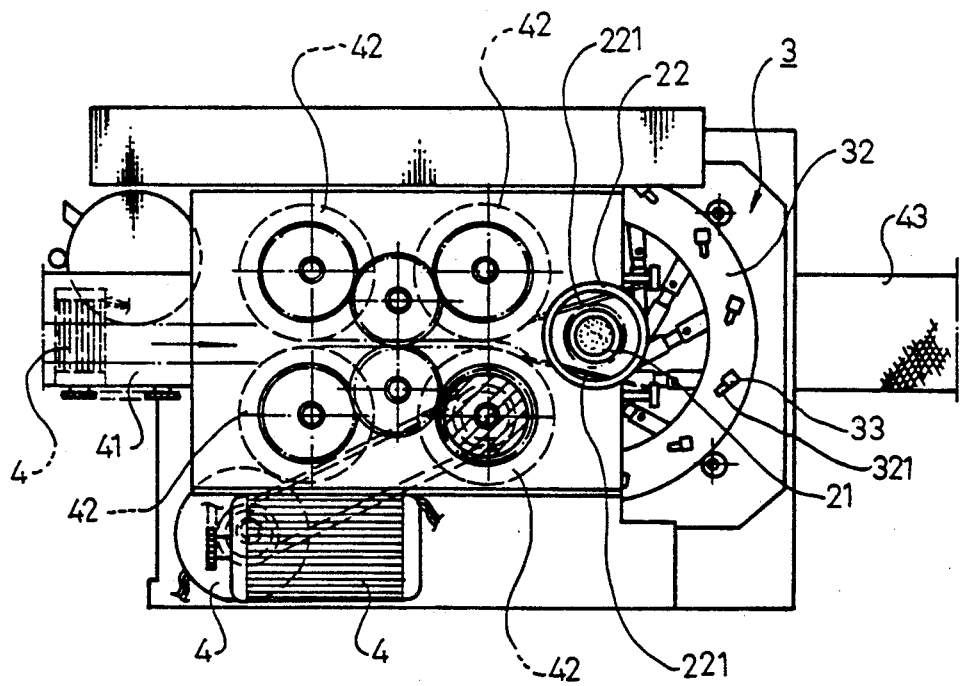
FIG. 7 is a cross sectional view taken along lines 7—7 of FIG. 4.
Figure 8:
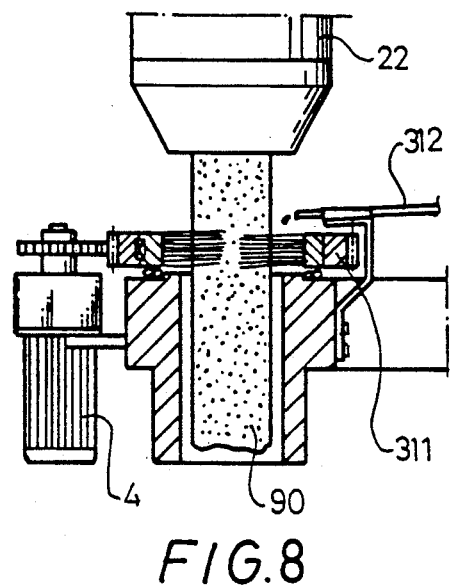
FIG. 8 is an enlarged view showing part of the apparatus as shown in FIG. 4.
Figure 9:
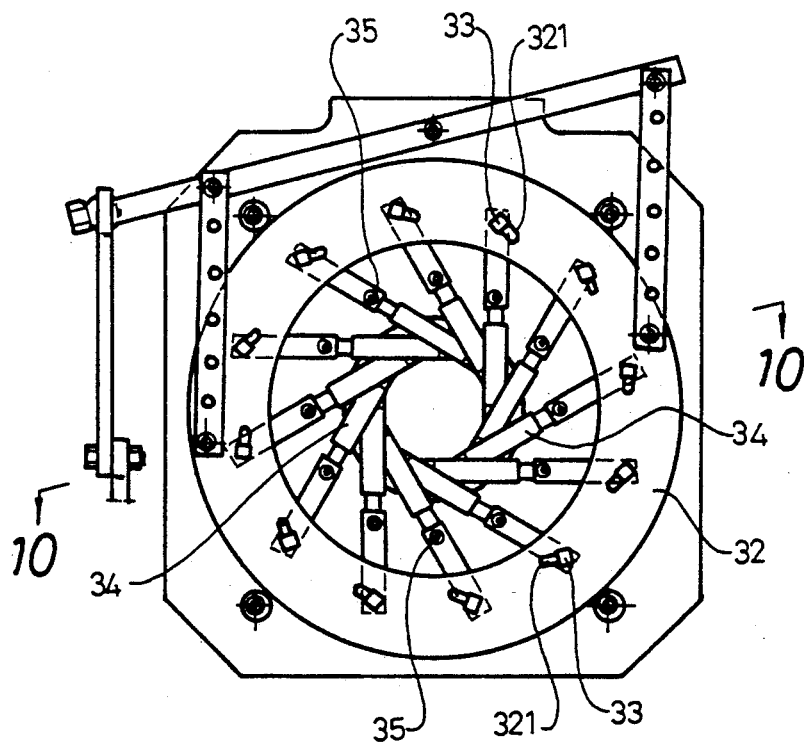
FIG. 9 is a cross sectional view taken along lines 9—9 of FIG. 4.
Figure 11:
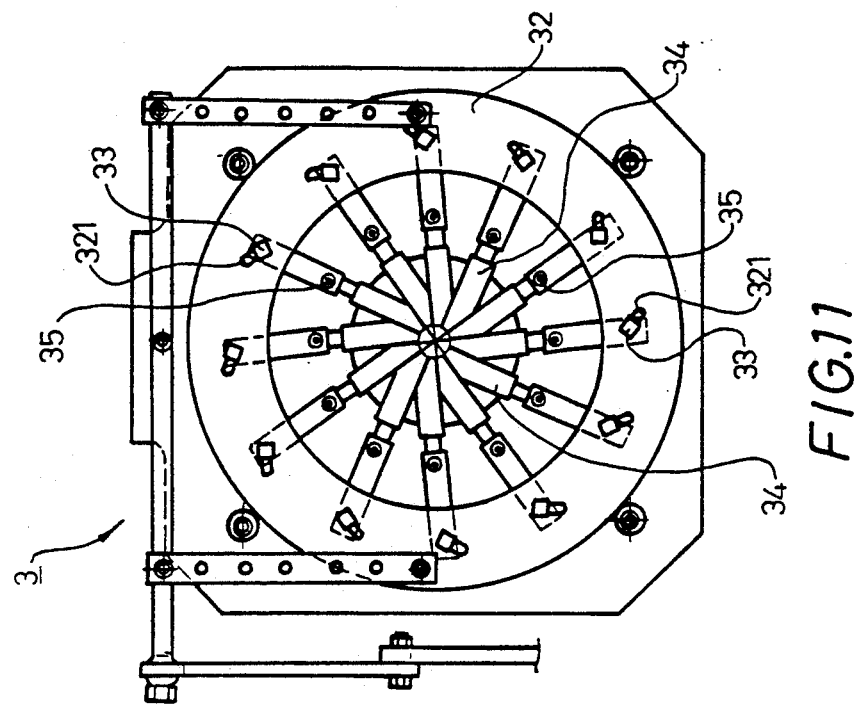
FIG. 11 is a cross sectional view similar to FIG. 9, illustrating the operations of the apparatus.
Figure 10:
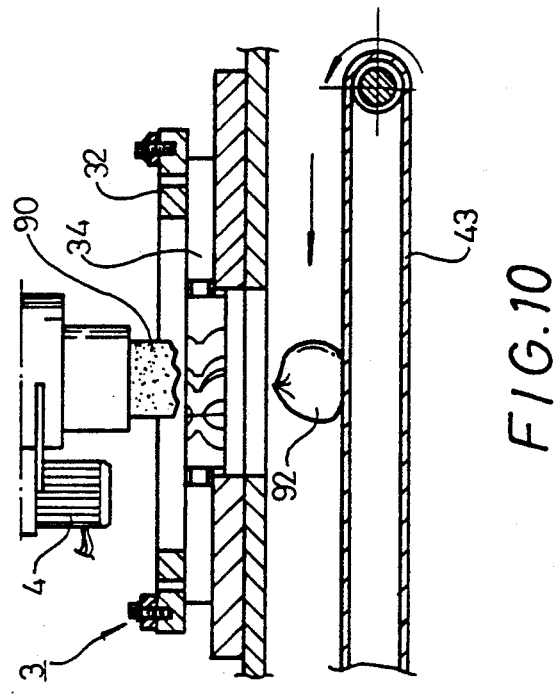
FIG. 10 is a cross sectional view taken along lines 10—10 of FIG. 9.

Referring next to FIGS. 2, 6 and 7, a conveyer 41 is provided to supply a longitudinal dough 90 toward three pairs of rollers 42 which roll and squeeze the dough into a strip of dough which is continuously supplied into the opening 26 of the barrel 22, a pair of guides 221 extend into the barrel 22 from the opening 26 and have one end contacted with one pair of the rollers 42 respectively, a plate 222 is engaged between the other ends of the guides 221 and is fixed to the barrel 22 by a screw 223 so as to retain the other ends of the guides 221 in place. The strip of dough 90 is guided into the barrel 22 by the guides 221, and will be engaged between the barrel 22 and the spring 25 (FIG. 5) so that the dough will be caused to move downward when the spring 25 is rotated. As shown in FIGS. 5 and 8, the dough 90 forms a column which moves downward beyond barrel 22, and the stuff moved downward from the tube 21 will be contained within the column of the dough 90.

Referring next to FIGS. 1 and 8, a brush 311 which is rotatable is provided below the barrel 22 and rotatable around the column of dough 90, and a pipe 312 is provided to supply oil, particularly the vegetable oil, into the brush such that the outer peripheral portion of the column of dough can be applied with a layer of oil, the column of dough is therefore prevented from sticking onto any object.

Referring next to FIGS. 1, 2, 9, 10 and 11, the shaping mechanism 3 is provided to cut and to shape the column of dough into buns 92 which will be sent out by a conveyer 43. The shaping mechanism 3 is fully shown and disclosed in U.S. Pat. No. 5,031,520 and will not be described in further details, the U.S. Patent is suggested to be taken as a reference.

Accordingly, the apparatus in accordance with the present invention can make buns automatically and occupies a relatively small space, such that the user is required to buy only one machine only.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An apparatus for making stuffed buns comprising a tube having an upper end for receiving stuff to be stuffed in said buns, means for driving said stuff downward along said tube, a barrel disposed on an outer and lower portion of said tube, an opening formed in said barrel for receiving a strip of dough, means for forming said dough into a column of dough and for moving said dough downward beyond said barrel, said stuff leaving said tube being contained within said column of dough, and a shaping mechanism disposed below said barrel for cutting and shaping said column of dough into said buns.

2. An apparatus according to claim 1, wherein a funnel is disposed above said tube for receiving said stuff to be stuffed in said buns, said tube is connected to said funnel, said funnel includes means for conveying said stuff into said tube.

3. An apparatus according to claim 2, wherein said tube includes a mouth formed therein and connected to said funnel, said conveying means includes a conveyer screw disposed in said funnel for conveying said stuff into said tube via said mouth when said conveyer screw is rotated.

4. An apparatus according to claim 1, wherein said driving means includes a coil spring rotatably disposed in said tube for driving said stuff downward along said tube.

5. An apparatus according to claim 1, wherein said forming and moving means includes a coil spring rotatably disposed between said tube and said barrel, said strip of dough is engaged between said coil spring and said barrel such that said strip of dough is rotated and caused to move downward along said barrel when said coil spring is rotated.

6. An apparatus according to claim 1 further comprising at least one pair of rollers for forming said strip of dough, at least one guide extended into said opening of said barrel and including one end contacted with either of said rollers for guiding said strip of dough into said barrel.

7. An apparatus according to claim 1 further comprising a brush rotatably disposed below said barrel for brushing said column of dough, and a pipe for supplying oil into said brush, whereby, said column of dough is applied with a layer of oil.

* * * * *